UNITED STATES PATENT OFFICE.

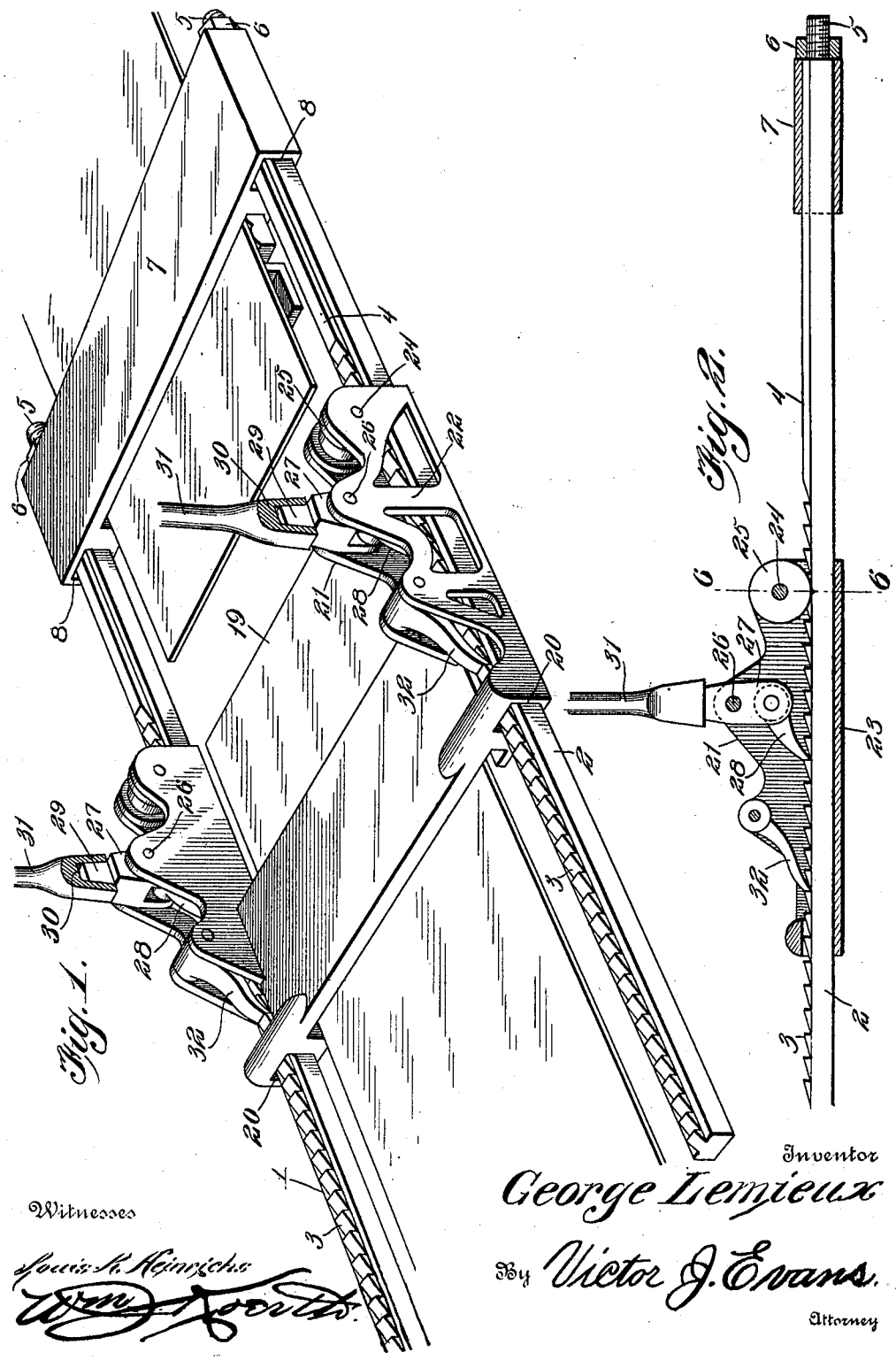

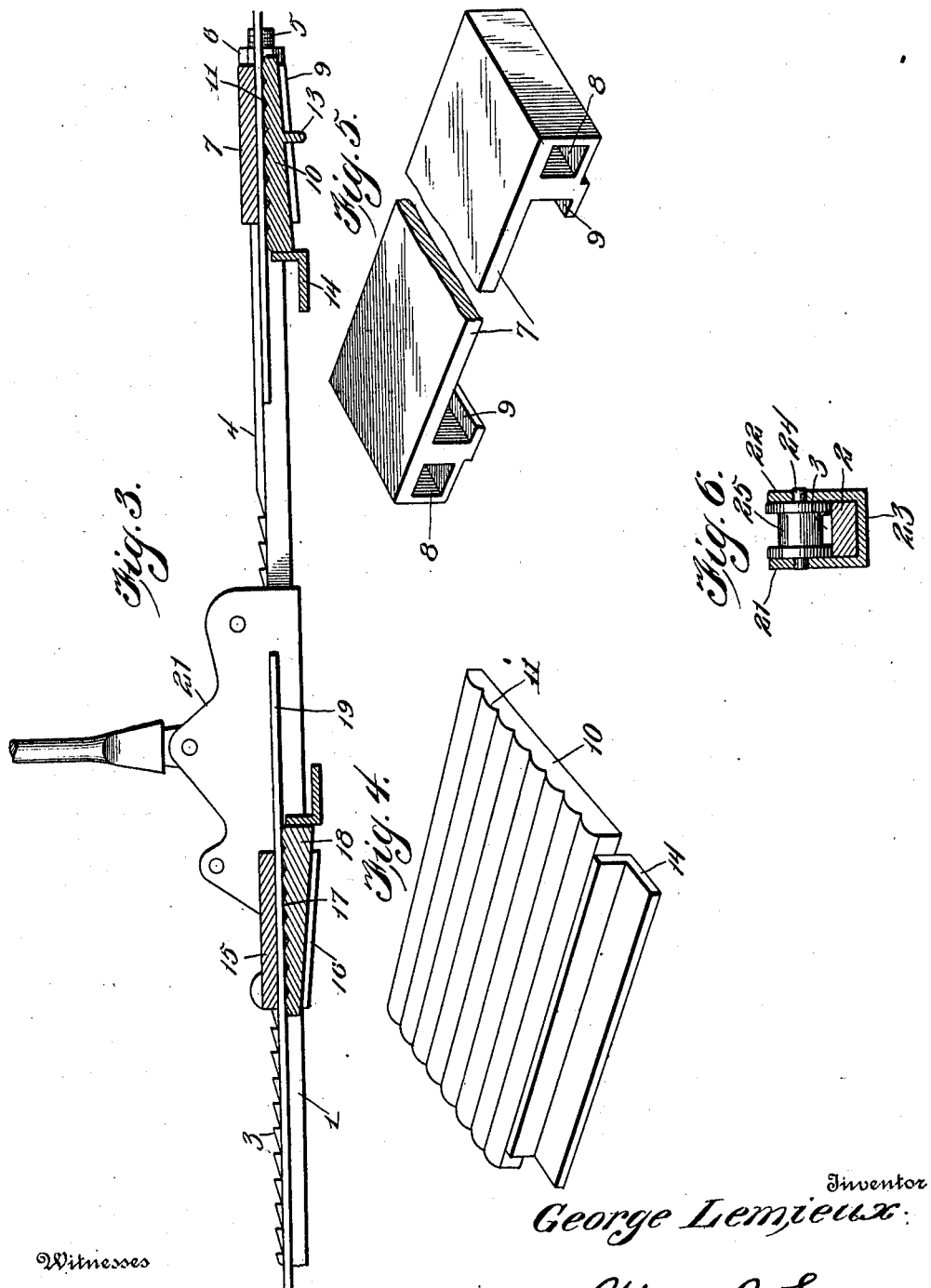

GEORGE LEMIEUX, OF WASHBURN, WISCONSIN.

BELT-CLAMP.

993,846.  Specification of Letters Patent.  Patented May 30, 1911.

Application filed December 6, 1910. Serial No. 595,889.

*To all whom it may concern:*

Be it known that I, GEORGE LEMIEUX, a citizen of the United States, residing at Washburn, in the county of Bayfield and State of Wisconsin, have invented new and useful Improvements in Belt-Clamps, of which the following is a specification.

This invention relates to improvements in belt stretchers and consists of an improved apparatus by means of which the belt may be readily and rapidly stretched or tightened and apparatus quickly and conveniently removed.

The various advantages of the construction will be apparent from the following description, in which reference is to be had to the accompanying drawings.

In the drawings, Figure 1 is a perspective view showing the apparatus in use in stretching or tightening a belt. Fig. 2 is a longitudinal sectional view of the same, taken in a line with the outer face of one of the longitudinally extending rack bars. Fig. 3 is a similar view taken through the clamping members. Fig. 4 is a perspective view of one of the wedge plates employed with the clamping members. Fig. 5 is a similar view of the outer or normal stationary clamping member, the wedge plate being removed. Fig. 6 is a detail sectional view upon the line 6—6 of Fig. 2.

The same parts shown in the drawing are indicated by similar reference characters throughout the several views.

The numerals 1 and 2 indicate the longitudinally extending rack bars of the device. These bars 1 and 2 are each of a similar formation and have their upper faces formed with a plurality of teeth 3 which commence adjacent one end thereof and terminate a suitable distance away from the opposite end. The teeth are of a lesser width than the rack bars, and the portion of the rack bar at the terminal of the teeth is formed with a track 4, the same being of a height and width corresponding with that of the teeth. The outer extremity of each of the rack bars 1 and 2 is reduced and threaded as at 5, and the said threads are adapted for the reception of nuts 6, the purpose of which will presently be apparent.

Mounted upon the spaced rack bars 1 and 2 and adapted to normally contact the enlarged nuts 6 provided upon the threaded extremities 5 thereof, is what I term the stationary clamping member 7 of the device. The said clamp 7 has its opposite ends formed with longitudinally extending passages 8 through which the portions of the rack bar provided with the tracks 4 are adapted to be inserted, and it will be noted that while the said clamp 7 is referred to as a stationary member, the same may be readily removed from the rack bars when the nuts 6 are disconnected from the threaded extremities of the said rack bars. The under face of the clamp is horizontally straight, or the portions of the clamp adjacent the ends formed with the passages 8 are provided with inclined overlying lips 9 so that the upper walls provided by the said lips diverge from the inner end of the clamp 7 toward the outer end thereof or toward that portion of the clamp contacting the nuts 6.

The numeral 10 designates the wedge shaped block which is adapted to engage between the horizontally straight under face of the clamp and the inclined lips 9. This wedge block has its inner face corrugated as at 11 and whereby the said wedge block will effectively retain a grip upon one end 12 of a belting. The under face of the wedge block 10 is formed with a longitudinally extending rib or reinforcement 13, while the inner or enlarged edge has secured thereto a longitudinally extending L-shaped member 14, the latter providing a finger hold whereby the wedge may be withdrawn from the clamp when the edges of the belt have been brought together and connected.

The numeral 15 designates the traveling clamp member of the device. This clamp member has its under face of a construction similar to that described in connection with the clamping member 7, the inclined lips 16 overlying the horizontally flattened under face 17 of the said clamping member, but the inclinations of the lips are disposed in an opposite direction to that of the lips 9. The wedge block 18 is also of a similar construction to that described in connection with the clamp 7, the same having its upper face corrugated and adapted to engage with the offset end 19 of the belting. The traveling clamp member 15 has its opposite sides formed each with a longitudinally extending passage 20, the same being formed through the medium of the longitudinally extending integrally formed side members 21 and 22 and the lower connecting member 23. The outer wall 22 is preferably of a skeleton formation, so that lightness is added to the clamp member 15 and whereby the device is also ornamental. The forwardly projecting side members 21 and 22 are provided with a shaft or trunnion 24, and mounted upon the said shaft or trunnion is a grooved wheel 25. The groove provided by the said wheel 25 is of a width sufficient to straddle the teeth 3 as well as the track 4 and to rest upon the upper faces of the rack bars adjacent the sides of the teeth and track. The numeral 26 indicates a second trunnion. Upon this trunnion 26 is mounted a member 27, the same having its lower extremity bifurcated to provide for the reception of a pivoted dog 28. The opposite end of the member 27 is reduced and of a substantially rectangular formation as indicated by the numeral 29 and the said rectangular members are each adapted for the reception of the rectangular bore 30 provided upon a removable operating lever 31. The dog 28, is of course, adapted to coact with the teeth 3 of the rack bars, and in order to prevent the rearward movement of the clamping member 15, the passage 20 is further provided with a pivoted gravity dog 32.

From the above description taken in connection with the accompanying drawings, the simplicity and advantages of the device as well as the mode of operation will be, it is thought, perfectly apparent to those skilled in the art to which the invention appertains, it being understood that the clamp member 7 may be readily removed from the rack bars after the ends of the belt have been connected together. It will be further noted that the traveling clamp member 15 is positive in its action and that the retractory movement of the same cannot take place unless the gravity dogs 32 are released from their engagement with the teeth 3. It will be still further noted that by providing the device with the grooved wheels 25 and adapting the same to be engaged upon the upper face of the rack bars adjacent the teeth and tracks thereof, the friction of the clamp 15, while traveling upon the rack bars is reduced to a minimum.

Having thus fully described the invention, what I claim as new, is:—

In a device for the purpose intended, a pair of rack bars, a pair of belt clamping members upon said rack bars, removable elements upon one of the ends of each of the rack bars adapted to contact one of the clamping members, the said rack bars each having their teeth spaced away from their longitudinal edges, and said rack bars being each provided with a track extending from the terminal of the teeth, the second clamp having its sides formed with a passage for the reception of the rack bars, a grooved wheel within the passage straddling the teeth and track and engaging the upper face of each of the rack bars, a bifurcated member pivoted within the passage, a pivoted dog connected with the bifurcated member and engaging the teeth of each of the rack bars, a removable lever for the bifurcated member, and a gravity dog also pivoted within each of the passages and adapted to engage the teeth of each of the rack bars.

In testimony whereof I affix my signature in presence of two witnesses.

GEORGE LEMIEUX.

Witnesses:
 WM. LANDRAID,
 H. P. AXELBERG.

---

Copies of this patent may be obtained for five cents each, by addressing the "Commissioner of Patents, Washington, D. C."